United States Patent [19]

Sweet

[11] 4,205,439
[45] Jun. 3, 1980

[54] GRASS CUTTING MACHINE

[76] Inventor: Dale F. Sweet, P.O. Box 757, Chandler, Ariz. 85224

[21] Appl. No.: 826,644

[22] Filed: Aug. 22, 1977

[51] Int. Cl.² ............................................. A01G 3/06
[52] U.S. Cl. ..................................... 30/276; 56/12.7
[58] Field of Search .................. 56/12.7, 295, 256; 30/276, 347

[56] References Cited

U.S. PATENT DOCUMENTS

| 4,020,552 | 5/1977 | Mizuno | 56/12.7 X |
| 4,024,635 | 5/1977 | Mizuno | 30/276 |
| 4,043,037 | 8/1977 | Okamoto | 30/276 |
| 4,095,338 | 6/1978 | Naohiko | 30/276 |
| 4,137,694 | 2/1979 | Hopper | 30/276 |

Primary Examiner—Jimmy C. Peters
Attorney, Agent, or Firm—Don J. Flickinger

[57] ABSTRACT

An elongate handle extends upwardly rearward from a frame which carries a forwardly extending boom. A motor carried by the frame rotatably drives a cutter head assembly at the free end of the boom. The frame is supported by a rearwardly located pair of wheels and a forward wheel assembly, the latter being vertically and pivotally adjustable for control of the cutter head assembly. The cutter head assembly is also pivotally adjustable about the longitudinal axis of the boom in response a rotatable hand grip at the free end of the handle. Lock means are provided to retain the wheel assembly and the cutter head assembly in selective positions.

6 Claims, 37 Drawing Figures

GRASS CUTTING MACHINE

This invention relates to devices for cutting grass, weeds and other vegetation.

More particularly, the present invention concerns machines of the type generically referred to as lawn trimmers or lawn edgers.

In a further aspect, the invention concerns new and useful improvements in power driven rotary lawn trimmers.

The prior art is replete with various power driven machines for trimming and edging lawns. Commonly, the machines include a power source, either an electric motor or an internal combustion engine, which drives a cutting device. The cutting device, usually having rotary motion, is worked along walks and driveways and around trees and planters to cut grass not readily accessible to regular lawn mowers.

In general, lawn trimmers can be placed into either of two basic classifications. One category embraces portable devices which are characterized as being carried by the operator. Such devices usually include an elongate tubular frame member having a cutter head assembly at the forward end and a power source attached to the rearward end. A flexible drive shaft extends through the tubular member and communicates between the power source and the cutter head assembly. The device is supported by a sling worn by the user. The operator manipulates the device and controls and cutting operation by one or more handles which extend from the tubular member.

Trimmers of the other type are of a variety of push machines. Commonly, push machines have a frame which is supported above the ground by wheels, usually two or more in number. A boom extends forwardly of the frame and supports a cutter head assembly at the forward end. A power source is mounted upon the frame and communicates with the cutter head assembly by a flexible drive means such as a V-belt. The operator guides the device by a handle extending rearwardly from the frame. The handle may be provided with a hand grip and manually manipulative motor controls proximate the free end thereof.

In either type of machine, the cutter head assembly has a rotatably driven spindle with a support hub projecting therefrom. Various types of rotary cutters have been devised for attachment to the hub. One type of rotary cutter has a pair of diametrically extending blades. Made of a hard rigid material, such as metal, the cutter has an aperture intermediate the blades for attachment to the hub. The leading edge of each blade is usually sharpened to enhance the cutting operation.

The other type of blade, a more recent innovation, employs flexible whip members to perform the cutting function. The whips, usually two or four, radiate from a rotor affixed to the hub of the cutter head assembly. Individual lengths of whip material may be used, however, it is more usual to provide an extended length of whip material wound about a spool which is held within the rotor. A separate spool is provided for each whip that radiates from the rotor.

Each type of trimmer has unique advantages and disadvantages. Portable devices are readily manipulated along irregular contours and near obstructions such as trees and fences. As an inherent limitation, portable devices are without stability, that is they do not bear against any solid stable platform. The operator must guide the device along the path to be trimmed and additionally control the cutting depth. This is a cumbersome and laborious, if not impossible, task for youngsters, oldsters and other persons not having certain minimal dexterity and strength. Even for the able, the weight of the machine, usually twenty-five pounds or more, is fatiguing resulting in decreased control or limited work periods.

Push type trimmers are more readily manipulated and therefore more desirable by persons with limited dexterity or physical strength and for extended periods of use. Being supported by a stable platform, the ground, such devices do not burden the user and can be readily released at the option of the user. Also, since the ground can provide a reference point for the frame, the cutting depth can be pre-set and the user need only guide the device.

Prior art push type trimmers, however, have not proven entirely satisfactory. The cutting depth, on those machines having adjustable height control, is pre-set by the user prior to commencing a task. Adjustment requires the use of tools and manipulative skills. For immediate depth adjustment of short duration, it is common practice to rock the machine forwardly for greater cutting depth and rearwardly for lesser cutting depth, with the user bearing a portion of the weight of the machine and being placed in an exceedingly unstable position. Neither does the user have immediate control of the angle of the cutting head. Frequently, it is desired, in the face of an immediate situation, to vary the cutting head between vertical, horizontal and various angular positions. Angular adjustment of the cutter head, similar to height adjustment, requires precise manipulative operations which for safety's sake must be performed with the power source inactivated.

Difficulties have also been encountered with prior art rotors of the type employing flexible whip cutter members. Generally, the rotor is a housing which carries two spools of whip material. Each spool feeds one externally extending whip member. As additional whip material is pulled, the spools rotate within the rotor, often at the expense of entanglement of the whip material. For practical reasons, rotors are of a maximum size. Therefore, the amount of whip material carried within the rotor is limited by the displacement of the spool. Also, winding whip material upon a spool is a tedious and laborious task.

It would be highly advantageous therefore to remedy the difficiencies associated with prior art lawn trimmers.

Accordingly, it is an object of the present invention to provide an improved grass cutting machine.

Another object of the invention is the provision of a grass cutting machine which is readily and conveniently manipulated by the operator.

And, another object of the invention is to provide a grass cutting machine especially adapted for use near and around obstructions.

Still another object of this invention is the provision of a grass cutting machine in which the cutting angle is under immediate control of the operator.

Yet another object of the invention is to provide a grass cutting machine having accomodations for adjusting the depth of the cut while the machine is in use.

Yet still another object of the instant invention is the provision of a grass cutting machine having automatic tension features for the drive means.

A further object of the invention is to provide a grass cutting machine which can utilize either electric or internal combustion engine sources.

And a further object of the invention is the provision of a new and useful adjustable wheel assembly for use with prior art push type lawn trimmers.

Yet a further object of the present invention is to provide improved cutting angle adjusting means which are combinable with pre-existing push type lawn trimmers.

Still a further object of the invention is the provision of an ameliorated rotary cutter device which is attachable to prior art portable type and push type trimmers.

And yet a further object of the invention is to provide an advanced cartridge of flexible whip material for use with various types of trimmers.

Briefly, to achieve the desired objectives of the present invention in accordance with a preferred embodiment thereof, first provided is a frame, which is supported by a pair of spaced apart wheels rotatable about an axis generally transverse to the frame. Preferably the spaced apart wheels are situated rearward of the center of gravity of the machine and the forward portion of the machine is supported by an adjustable wheel assembly. An elongate handle member extends upwardly rearward from the frame and has a hand grip proximate the free end thereof to accommodate the operator. A boom extends forwardly from the frame and carries a cutting head assembly at the free end thereof. The cutting head assembly is rotatable about the longitudinal axis of the boom and has a cutter supporting hub, which is rotatable about an axis substantially radial to the longitudinal axis of the boom.

A power unit carried by the machine rotatably drives the cutter supporting hub.

A manually rotatable member, such as a hand grip, is carried proximate the free end of the handle and communicates with the cutting head assembly through elongate connection means. The cutting head assembly rotates in response to rotation of the hand grip by the operator. Lock means retain the cutting head in a selected position. In a preferred embodiment, the cutting head assembly is rotatably mounted at the free end of the boom. In accordance with an alternately preferred embodiment of the invention, the cutting head assembly is rigidly affixed to a rotating boom.

In a preferred embodiment, the wheel assembly includes a shaft which is slidably disposed within a housing affixed to the frame. A wheel is carried proximate the lower end of the shaft and is rotatable about an axis generally radial to the shaft. Detent means is responsive to manipulative control proximate the free end of the handle at selected slidably attained positions within the housing.

Provided in the improved rotor is a substantially closed housing formed of a pair of opposed detachably engageable cup-shaped members. A cartridge of whip material resides within each cup-shaped member. An egress is provided for each cartridge. Clamp means carried by the housing releasably retard the movement of the whip material through the egress.

The foregoing and further and more specific objects and advantages of the instant invention will become readily apparent to those skilled in the art from the following detailed description of preferred embodiments thereof taken in conjunction with the drawings in which:

Figures 1, 2:
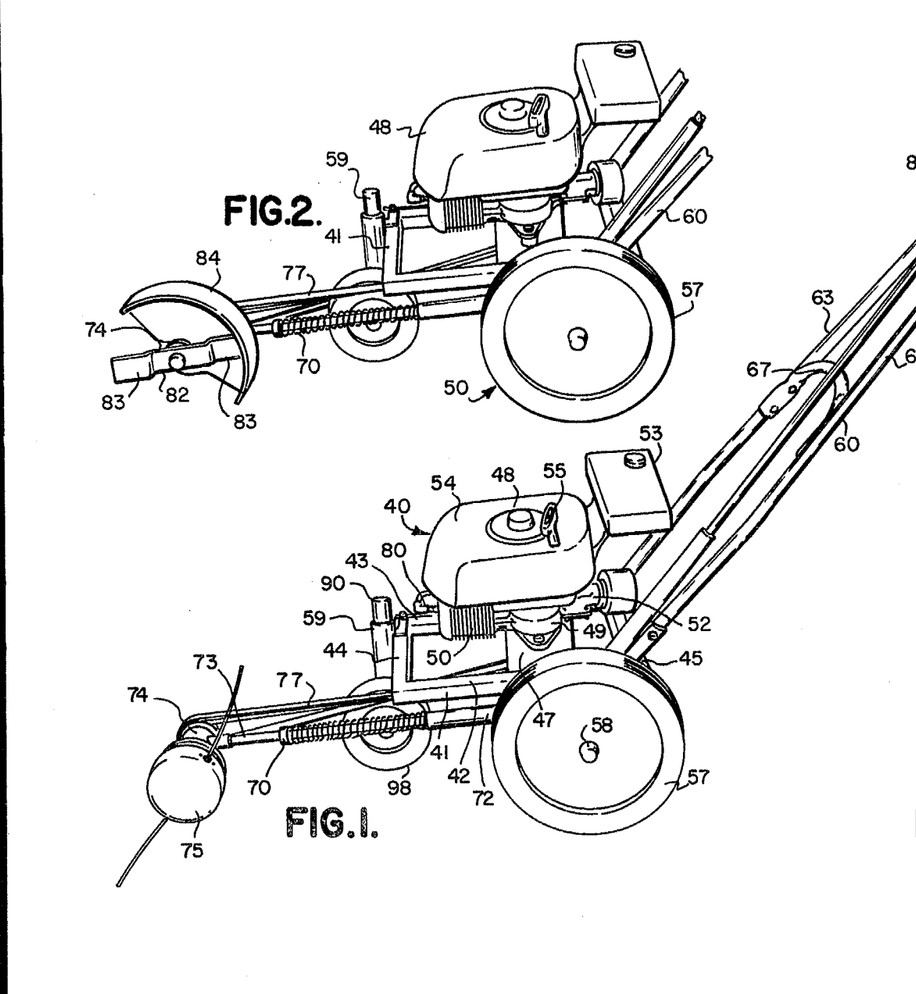
FIG. 1 is a perspective view of a grass cutting machine constructed in accordance with the teachings of the instant invention.
FIG. 2 is a partial perspective view of the device of FIG. 1 as it would appear when used in combination with a prior art cutting blade device.

Turning now to the drawings in which the same reference characters indicate corresponding elements throughout the several views, attention is first directed to FIG. 1 which shows a grass cutting machine, generally designated by the reference character 40, embodying the principles of the instant invention. Grass cutting machine 40 includes frame 41 having left and right side rails 42 and 43 which are connected at respective ends by front transverse rail 44 and rear transverse rail 45. Rails 42 and 43 are designated left and right respectively for purposes of references and are so designated as seen from the operator's view.

A platform 47 extends laterally between side rails 42 and 43. In accordance with conventional practice, the several rails comprising the frame and the platform are formed of steel or other metal and are joined by welding or other expediencies well known in the metal working art. Platform 47 functions as a motor mount for internal combustion engine 48. Internal combustion engine 48 is a small conventional engine as commercially supplied by many manufacturers for the intended purpose. For reference purposes, internal combustion engine 48 includes crank case 49, cylinder 50, carburetor and air filter 52, fuel tank 53, protective cover 54 and pull starter 55. It will be appreciated that small internal combustion engines of the type illustrated are commonly provided with mounting means usually associated with the crank case. Securement of engine 48 to motor mount 47 will vary in accordance with the specific manufacturer of the engine, but in all cases will be readily apparent to those skilled in the art.

A pair of wheels 57 support frame 41 in an elevated position above the ground. In the immediate view only one wheel 57 is visible. In accordance with conventional practice, as will be appreciated by those in the art, one wheel 57 is carried on either side of frame 41. Each wheel 57 is rotatable about an axle 58, the longitudinal axis of which is transverse to frame 41. Wheels 57 are coaster wheels and capable of rotating at differential speeds, as is necessary during turning.

Preferably, wheels 57 are rearward of the center of gravity of machine 40. Forwardly, machine 40 is supported by wheel assembly 59 secured to front transverse rail 44. Wheel assembly 59 is a part of the instant disclosure and will be described in detail hereinafter.

Elongate handle 60 extends upwardly rearward from frame 41 and includes shaft elements 62 and 63. Shaft elements 62 and 63 have free ends 64 and 65, respectively, and are joined in an intermediate position by brace 67. Handle 60 is fabricated in accordance with conventional and well known practice and similarly is rigidly affixed to frame 41. Free ends 64 and 65 of shaft elements 62 and 63 diverge for convenience of the operator and carry hand grips 68 and 69, respectively.

Boom 70 having rearward end 72 and forward end 73 extends forwardly from frame 41. Cutting head assembly 74 is carried at the free end of boom 70 and supports rotor 75. Boom 70, cutting head assembly 74 and rotor 75 will be described in detail presently.

Endless belt 77 transmits rotational force from engine 48 to cutting head assembly 74 for rotating rotor 75. Elongate control mechanism 78 communicates between hand grip 68 and boom 70. Similarly, handle means 79 and cable 80 are associated with wheel assembly 59. The foregoing will become clear as the description ensues.

As seen in FIG. 2, cutting head assembly 74 can support a conventional cutter having diametrically opposed blades 83 which may be sharpened to form respective cutting edges and partially enclosed by guard 84.

Figure 3:
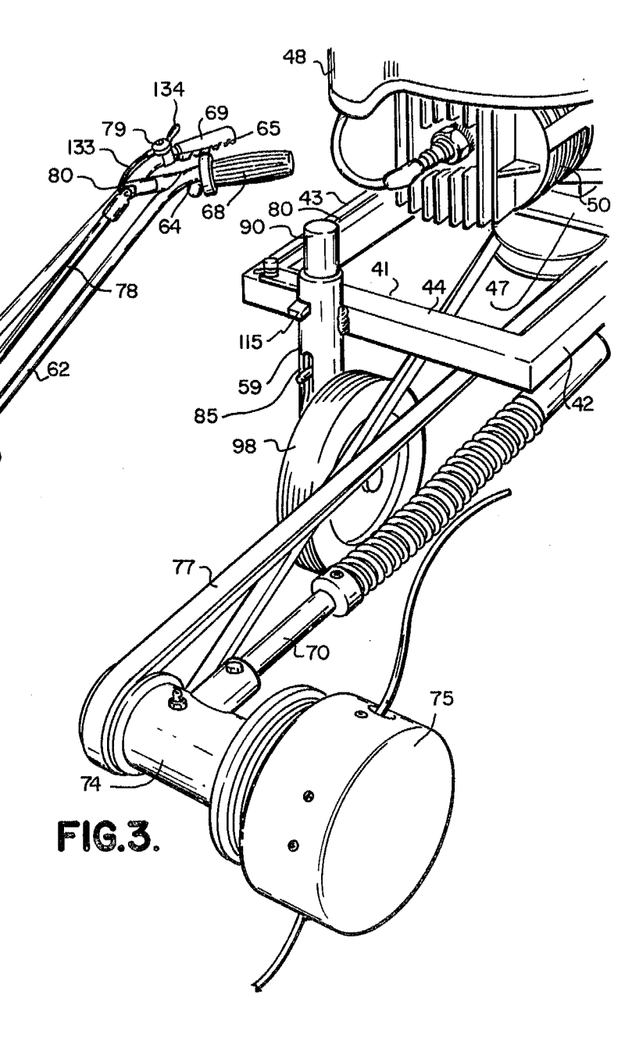
FIG. 3 is an enlarged partial perspective view of the front portion of the machine of FIG. 1.
Figure 4:
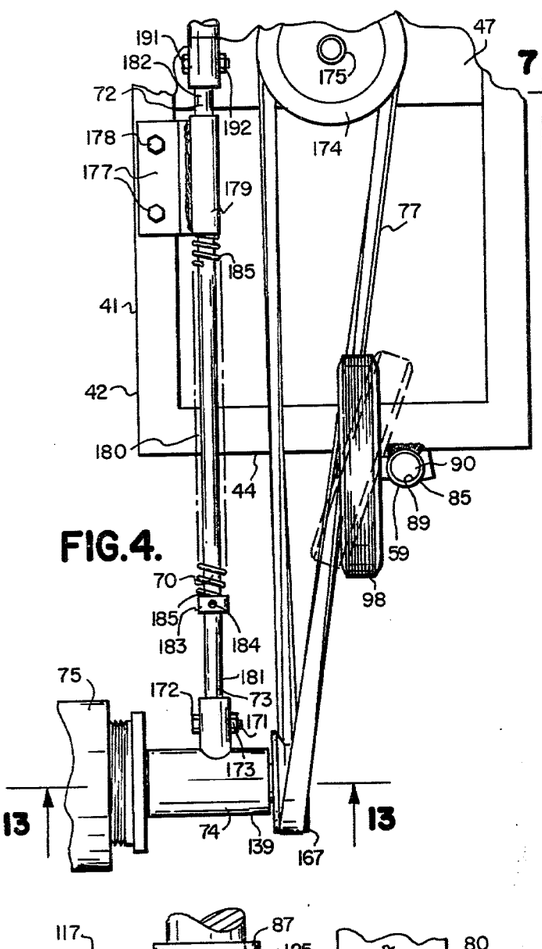
FIG. 4 is a bottom plan view, partially broken, and generally corresponding to the illustration of FIG. 3.
Figure 5:
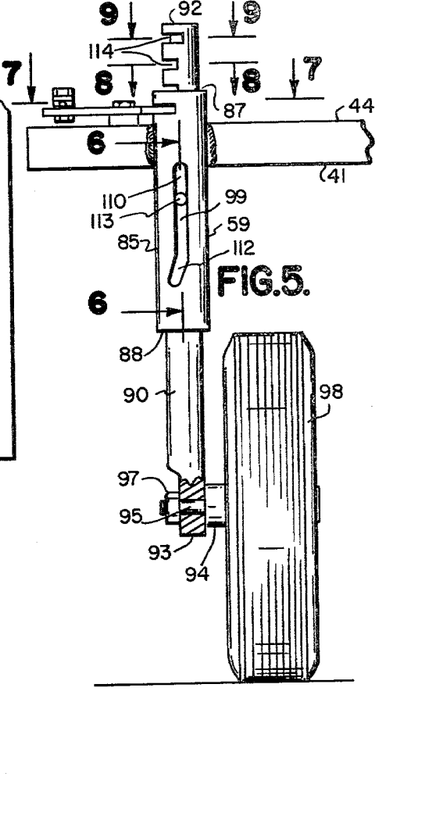
FIG. 5 is a front elevation view of the wheel assembly of the device of FIG. 1.

Wheel assembly 59, as seen in FIGS. 3, 4 and 5, has an elongate housing 85 attached as by welding to front transverse rail 44 of frame 41. Housing 85 has an upper open end 87, a lower open end 88 and a bore 89 extending between the ends. Housing 85 is attached to rail 44 such that bore 89 is substantially vertical. For ease of manufacturing, housing 85 is a relatively heavy-walled hollow cylindrical tube.

Shaft 90, having upper end 92 and lower end 93, is slidably and rotatably journaled within bore 89 of housing 85. Axle 94 extends through bore 95 proximate lower end 93 and is secured to shaft 90 by nut 97. In accordance with conventional practice, coaster wheel 98 is rotatably supported by axle 94. The longitudinal axis of axle 94 is radial to shaft 90 and generally transverse to frame 41.

Figure 6:
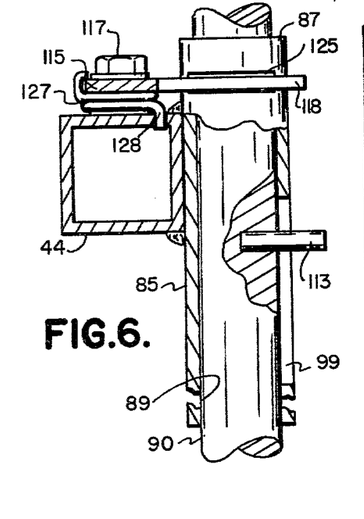
FIG. 6 is an enlarged view, partly in section, of the wheel assembly as seen in FIG. 5.
Figure 7:
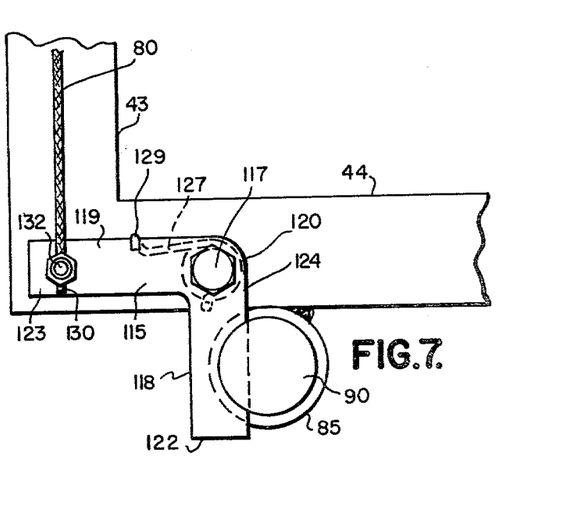
FIG. 7 is a horizontal sectional view taken along the line 7—7 of FIG. 5.

As further seen in FIG. 6, slot 99 extends radially through the side wall of housing 85. Slot 99 has a first section 110 which is in longitudinal alignment with bore 89 and a second section 112 continuous with the lower end of section 110 and extending spirally of bore 89. Guide pin 113 extends radially from shaft 90 and is slidably received within slot 99. Preferably, guide pin 113 is a cylindrical dowel pin press fitted into a mating bore drilled into shaft 90. Thus it is seen that shaft 90 is slidable relative housing 85 within limits determined by the length of slot 99. Shaft 90 is also rotatable relative housing 85 as determined by the movement of guide pin 113 in second section 112. The movement of shaft 90 within housing 85 raises and lowers the frontal portion of frame 41 and angularly displaces wheel 98 relative frame 41, the purpose of which will be seen presently.

Figure 8:
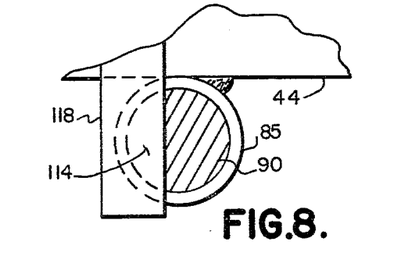
FIG. 8 is a horizontal sectional view taken along the line 8—8 of FIG. 5.
Figure 9:
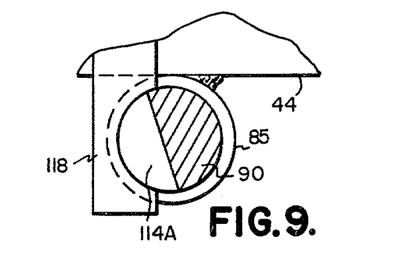
FIG. 9 is a horizontal sectional view taken along the line 9—9 of FIG. 5.

Referring also to FIG. 8, a plurality of transverse slots 114 are formed in shaft 90 in spaced apart alignment extending from upper end 92. The uppermost slot, designated 114, is angularly displaced from the other slots 114 by a factor equal to the angular rotation of shaft 90 as guide pin 113 moves through slot section 112. In accordance with a preferred embodiment of the invention, wheel 98 moves between a first position in which wheel 98 is aligned for straight forward and rearward movement of machine 40 to a second position angularly displaced by approximately 18° for turning machine 40 to the right.

A retention member 115 is pivotally connected to front transverse rail 44 by shoulder bolt 117. Retention member 115 is generally L-shaped, having first arm 118 and second arm 119 which radiate from a mutual first end 120 and terminate with respective second ends 122 and 123. Mutual first end 120 is pivotal about the vertical axis of shoulder bolt 117.

Outboard edge 124 of arm 118 passes through slot 125 in housing 85 and is received in any selected one of the several slots 114. Torsion spring 127 encircles shoulder bolt 117 and has a first leg 128 anchored in rail 44 and a second leg 129 bearing against arm 115 for normally urging arm 118 through slot 125 and into engagement with slot 114. Arm 118 and the several slots 114 are considered detent means for retaining shaft 90 at selected slidably attained positions within housing 85.

The lower end 130 of cable 80 is secured to arm 119 proximate end 123 by conventional cable clamp means 132. The upper end 133 of cable 80, as best seen in FIG. 1, is secured to handle means 79. Lever 134 extends from handle means 79 and is in a position to be manipulated by the hand of the operator normally grasping hand grip 69. Lever 134 is moveable between a first position and a second position. In the first position, cable 80 is relaxed and spring 127 is free to move arm 118 into engagement with slot 114. In the second position, tension is pulled on cable 80 moving arm 119 rearwardly against spring 127 and pivoting retention member 115 about shoulder bolt 117, withdrawing arm 118 from slot 114.

Other arrangements of the detent means as described above will readily occur to those skilled in the art. For example, the retention member may be in the form of a single leg extending longitudinally of rail 44. In this arrangement the single arm would be pivotally connected to the left of housing 85 and secured to cable 80 at the right side of housing 85. Slots 114 and 125 would, of course, be displaced 90° clockwise.

To lower wheel 98, the operator pushes downwardly on hand grips 68 and 69, raising the frontal portion of frame 41 and lifting wheel 98 from the ground. Simultaneously, lever 134 is moved to the second position, retracting arm 118 from the previously selected slot 114. In response to the pull of gravity, shaft 119 will slide downwardly within bore 89. Subsequently, lever 134 is moved to the first position and arm 118 re-engaged with the newly selected slot 114. In a reverse motion for lowering rotor 75, lever 134 is moved to the second position and hand grips 68 and 69 are urged upwardly, urging shaft 90 upwardly within bore 89. Subsequently, lever 134 is moved to the first position and arm 118 is re-engaged with the newly selected slot 114. It is apparent, therefore, that the height of rotor 75 and, consequently, the depth of cutting and trimming, is readily under control of the operator.

Figure 10:
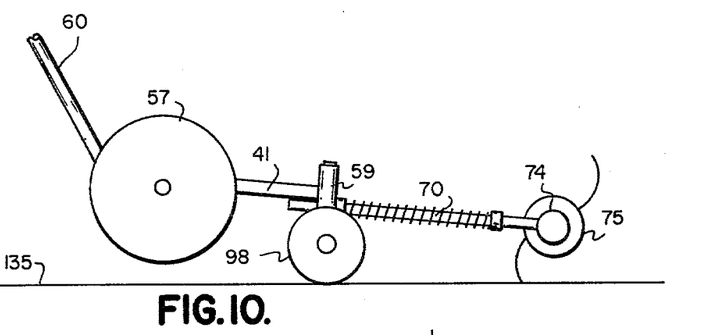
FIG. 10 is a semi-schematic view of the grass cutting machine of FIG. 1 and useful for illustrating a principle associated with the wheel assembly as illustrated in FIGS. 5-9.
Figure 11:
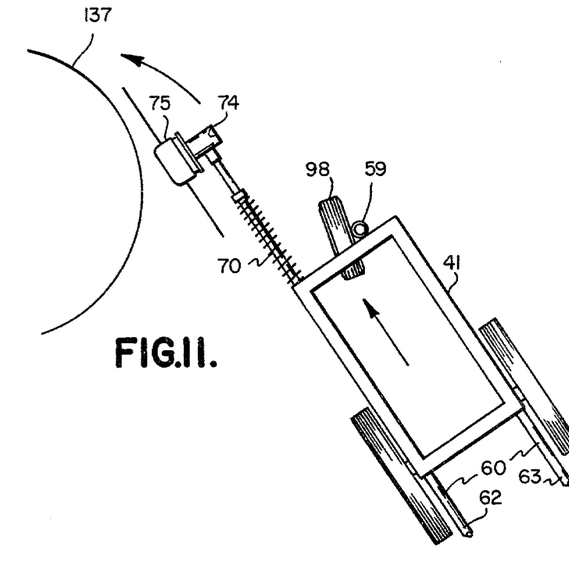
FIG. 11 is a semi-schematic top plan view of the device of FIG. 1 and used for illustrating another principle associated with the wheel assembly.
Figure 12:
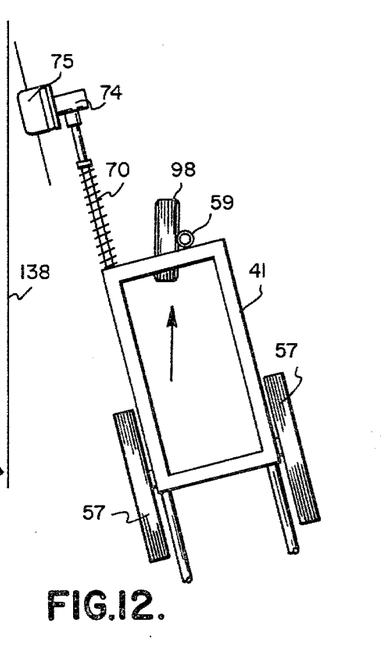
FIG. 12 is a view generally corresponding to the view of FIG. 11 and illustrating a further utility associated with the wheel assembly.

Cutting and trimming machine 40 is especially useful for working near stationary objects. This is accomplished by lowering shaft 90 such that pin 113 enters slot section 112 and engaging arm 118 with the uppermost slot 114a. Wheel 98 is now in the lowermost position and offset to the normal axis of frame 41. The operator then lifts upwardly on hand grips 68 and 69, raising wheels 70 above ground level 135, as seen in FIG. 10. To steer around a circular object such as tree 137, as illustrated in FIG. 11, cutting head 70 must be constantly urged into the direction of the cut. Resultingly, handles 60 are substantially further from tree 137 than with a conventional grass cutting machine equipped with a solidly affixed front wheel. A similar advantage is seen in FIG. 12, whereby rotor 75 is worked in close proximity to wall 138 with handle 60 extending angularly outward therefrom, providing substantial clearance for the operator.

Figure 13:
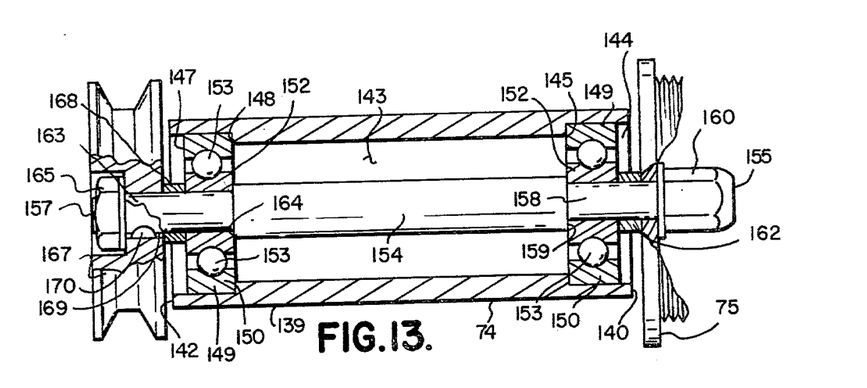
FIG. 13 is a vertical sectional view of a cutter head assembly in accordance with the teachings of the instant invention and taken along the line 13—13 of FIG. 4.

Cutting head assembly 74, as best illustrated in FIGS. 4 and 13, includes hollow cylindrical housing 139 having first end 140, second ends 142 and bore 143. Counterbore 144 extends inwardly from first end 140 and terminates with shoulder 145. Similarly, bore 147 extends inwardly from second end 142 and terminates with shoulder 148. A bearing 149, herein specifically illustrated as a ball bearing, resides within each bore 144 and 147. Each bearing includes an outer race 150 which is closely received within the respective counterbore and against the respective shoulder 145 and 148. Each bearing 149 further includes an inner race 152 and balls 153. Shaft 154, having first end 155 and second end 157, extends through housing 139. Shaft 154 has a first reduced diameter section 158 which passes through inner race 152. First annular shoulder 159 extending radially between shaft 154 and first reduced diameter section 158 abuts the inboard edge of inner race 152. First end 155 of shaft 154 is threaded to engage with nut 160. The reduced diameter section 158, with terminal section and nut 160, provide a hub for supporting rotor 75 or cutter 82. Cylindrical spacer 162 encircles reduced diameter section 158 and bears against inner race 152 to hold rotor 75 in a spaced position from end 140 of housing 139.

Similar to the foregoing, shaft 154 has a second reduced diameter section 163 and shoulder 164 proximate second end 157. The free end of second reduced diameter section 163 is threaded to receive nut 165. Conventional V-belt pulley 167 is carried on second section 163 and spaced from end 142 by cylindrical spacer 168. Internal key way 169 of pulley 167 mates with Woodruff key 170 held by second section 163 for driving engagement between V-belt pulley 167 and shaft 154.

Tubular member 171 extends radially from housing 139 and forms a socket for receiving forward end 73 of boom 70. Cutting head assembly 174 is securely affixed to boom 70 by bolt 172 extending through tubular member 171 and boom 70 and secured by nut 173. As seen, shaft 154 rotates about an axis which is radial to the longitudinal axis of boom 70. V-belt pulley 174 is secured by means of bolt 175 to the free end of the drive shaft of engine 48, which extends below platform 47. The drive shaft of engine 48 is not specifically herein illustrated, but the attachment thereof, including the use of keys or splines, should be readily understood by those skilled in the art. Endless belt 77 is engaged with pulleys 174 and 167 and transmits rotational force from engine 48 to cutting head assembly 74.

Figures 14, 15, 16:
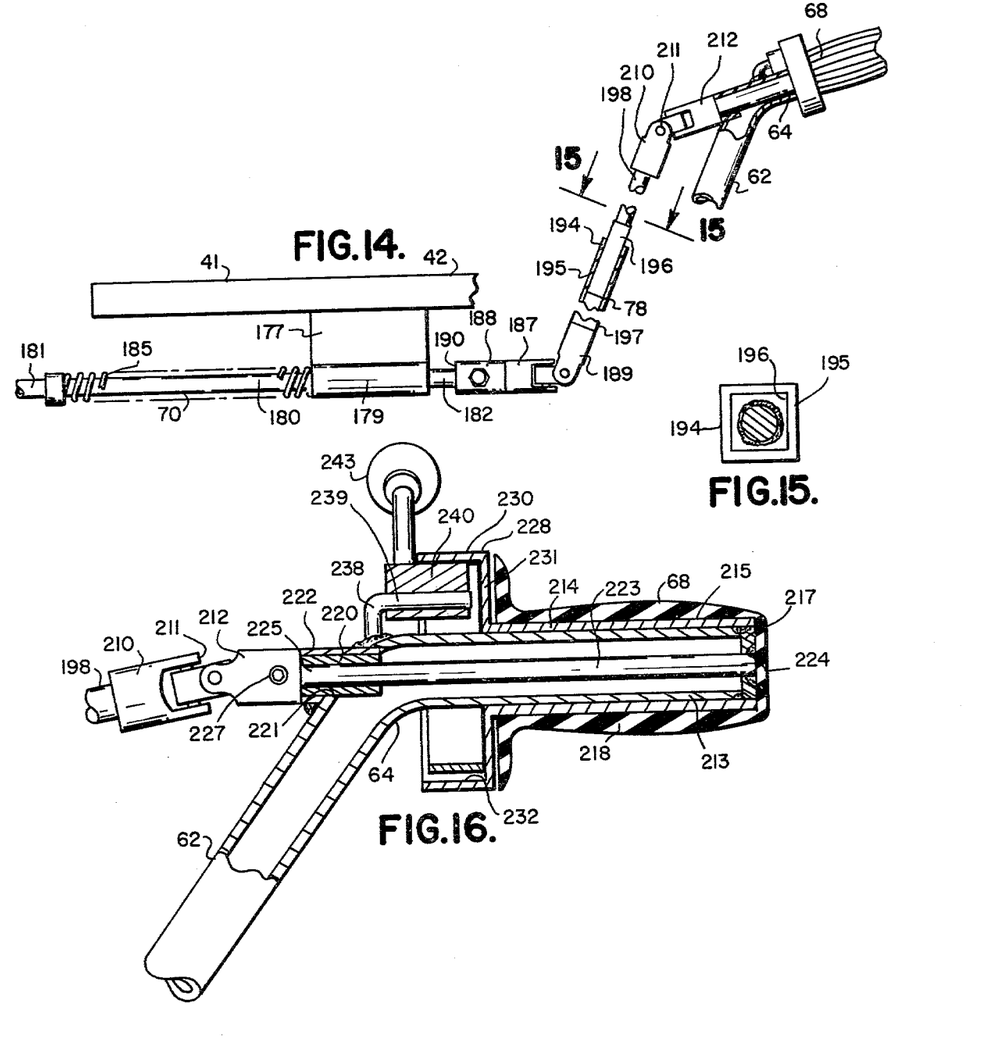
FIG. 14 is an elevation view partly in section of the structure associated with the device of FIG. 1 and used for angular adjustment of the cutting head assembly, fragmentary portions of the grass cutting machine of FIG. 1 being shown for reference purposes.
FIG. 15 is a sectional view taken along the line 15—15 of FIG. 14.
FIG. 16 is an enlarged elevation view partly in section of the upper rearward end of the structure illustrated in FIG. 14.

Boom 70 is best described with references to FIGS. 4 and 14, where there is seen a bracket 177 secured to the under side of left rail 42 by bolts 178. Bracket 177 is generally L-shaped and supports hollow cylindrical member 179. Shaft 180, having forward end 181 and rearward end 182 is slidably and rotatably carried within the bore (not specifically herein illustrated) of hollow cylindrical member 179. Collar 183 encircles shaft 180 at a forward position spaced from cylindrical member 179 and is held in place by set screw 184. Compression spring 185 encircles shaft 180 and has respective ends abutting cylindrical housing 179 and collar 183. Compression spring 185 urges shaft 180 in a forward direction and tensions belt 77.

Flexible joint element 187, as will be understood by those skilled in the art, is secured to rearward end 182 of shaft 180. Flexible joint element 187 includes oppositely extending attachment members 188 and 189. Attachment member 188 has a free end 190 with a socket formed therein for receiving shaft 180. Bolt 191 extends through appropriate apertures in attachment member 188 and end 182 and is engaged with nut 192 to firmly affix shaft 180 to flexible joint element 187. The free end 190 of attachment member 188 abuts hollow cylindrical member 179 to limit the forward movement of boom 70 in response to spring 185 when belt 77 is removed.

An elongate telescoping element 194, having outer section 195 and inner section 196, is secured at one end 197 thereof to attachment member 189. The other end 198 of telescoping element 194 is secured to attachment member 210 of flexible joint element 211, also having attachment member 212.

As seen in FIG. 15, outer section 195 of telescoping element 194 is a generally square hollow tubular member. Inner section 196 is sized and shaped to be slidably received within outer section 195. This provides rotational drive between sections 195 and 196 and concurrently provides a slip joint of variable length, the purpose of which will be appreciated presently.

Attention is now directed to FIG. 16 which shows an elongate tubular element 213 extending from free end 64 of handle shaft element 62. Hand grip 68 includes cup-shaped member 214 having cylindrical body 215 and end plate 217 which is rotatably journaled about tubular element 213. For convenience of the operator, cup-shaped member 214 is encased in a contoured grip 218 fabricated of a rubber or plastic material.

A bushing 220 extends through opening 221 in handle shaft element 62 and is held in place by tubular projection 222 affixed as by welding to shaft element 62. Bushing 220 is axially aligned with elongate tubular element 213 and cylindrical body 215. Shaft 213, having first and second ends 224 and 225 respectively is rotatably journaled within bushing 220. First end 224 of shaft 223 is welded or otherwise secured to end plate 217 of cup-shaped member 214. Second end 225 of shaft 223 enters a socket in attachment member 212 and is held therein by set screw 227.

Rotation of hand grip 68 is transmitted through shaft 223, flexible joint element 211, telescoping element 194 and flexible joint element 187 to shaft 180 for immediate operator control of the angle of cutting head assembly 74 and rotor 75 as will be further illustrated presently. As seen in FIG. 4, pulley 174 rotates about a generally vertical axis while pulley 167 rotates about a generally horizontal axis. In order to accommodate both pulleys 167 and 174, belt 77 is caused to twist. As cutting head assembly 74 is rotated in a counterclockwise direction with respect to shaft 180, as seen from the operator's position, pulley 167 is brought into closer axial alignment with pulley 174. The foregoing described movement of cutting head assembly 74 tends to remove the twist from belt 77 and effectively lengthening belt 77. In response thereto, spring 185 urges cutting head assembly 74 forward, maintaining tension upon belt 77.

Cam locking means retain the cutting head assembly in a selected position of rotation.

Figures 17, 18:
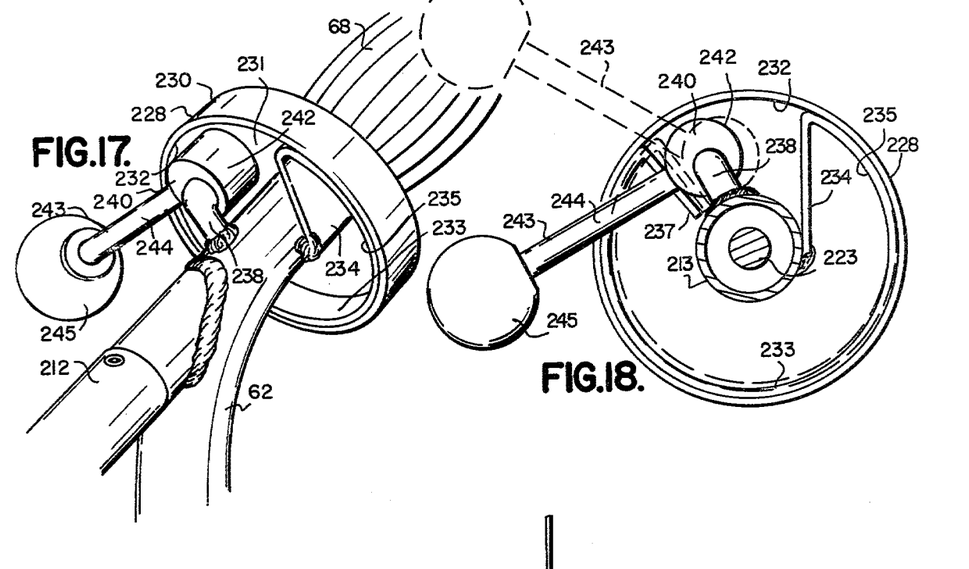
FIG. 17 is a perspective view of a fragmentary portion of the structure illustrated in FIG. 16.
FIG. 18 is a semi-schematic representation illustrating the operation of the mechanism illustrated in FIG. 17.

With specific reference to FIGS. 16, 17 and 18, there is seen a drum 228 including a cylindrical section 230 attached to cup-shaped member 114 by radial flange 231. Drum 228 has an inner cylindrical surface 232 concentrically rotatable with hand grip 68. An elongate resilient member 233, such as a strap of spring steel, resides within drum 228. Resilient member 233 has a first end 234 which is firmly affixed to tubular element 213, an intermediate section 235 curved and in close proximity to inner surface 232 and a terminal section 237 extending radially inward. Bracket 238 is rigidly affixed to shaft element 62 and has a cylindrical finger extending into drum 228 substantially parallel with inner surface 232. Camming member 240, having external surface 242 is eccentrically journaled on cylindrical finger 239. Handle 243, having stem 244 and knob 245, extends radially from camming member 240.

Camming member 240 is located to be free of inner surface 232 of drum 228. As specifically seen in FIG. 18, outer surface 241 of camming member 240 is frictionally engageable with terminal section 237 of resilient member 233. Handle 243 is moveable between a first position, shown in solid outline, and a second position, shown in dashed outline. In the first position, external surface 242 of camming member 240 bears against and displaces terminal section 237 urging intermediate section 233 into locking engagement with inner surface 232 of drum 228. In the second position, pressure is at least partially relieved from terminal section 237 and intermediate section 233 relaxes resiliently moving into the normal position which is spaced from inner cylindrical surface 232. Due to the frictional engagement between external surface 242 of camming member 240 and terminal section 237, handle 243 will tend to remain in either position which it is placed by the operator.

Figure 19:
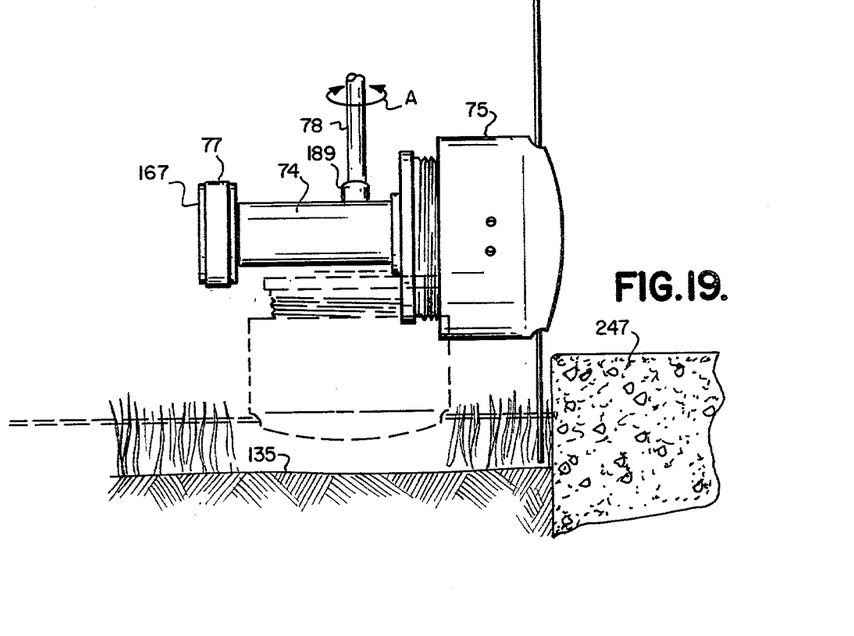
FIG. 19 is a semi-schematic illustration of the cutting head assembly of the instant invention and further describing the angular adjustment thereof in connection with the mechanism as described in connection with FIGS. 14-18.

FIG. 19 illustrates two definite positions of cutting head assembly 74 obtainable by rotating hand grip 68. As previously described, rotary motion is transferred through control mechanism 78 as indicated by double ended arrow A. In the first position, shown in solid outline, cutting head assembly 74 is substantially horizontal and is particularly useful for cutting unwanted grass or plant growth extending upwardly from ground level 135 over an object, such as shown by the edge of sidewalk 247. In the second position, shown in dashed outline, cutting head assembly 74 is substantially vertical and especially adapted for general cutting particularly in areas such as adjacent sidewalk 247 where the growth is not accessible to a standard lawn mower. As will be readily understood by those skilled in the art, cutting head assembly 74 may be rotated to and locked in other angular positions.

Figures 20, 21:
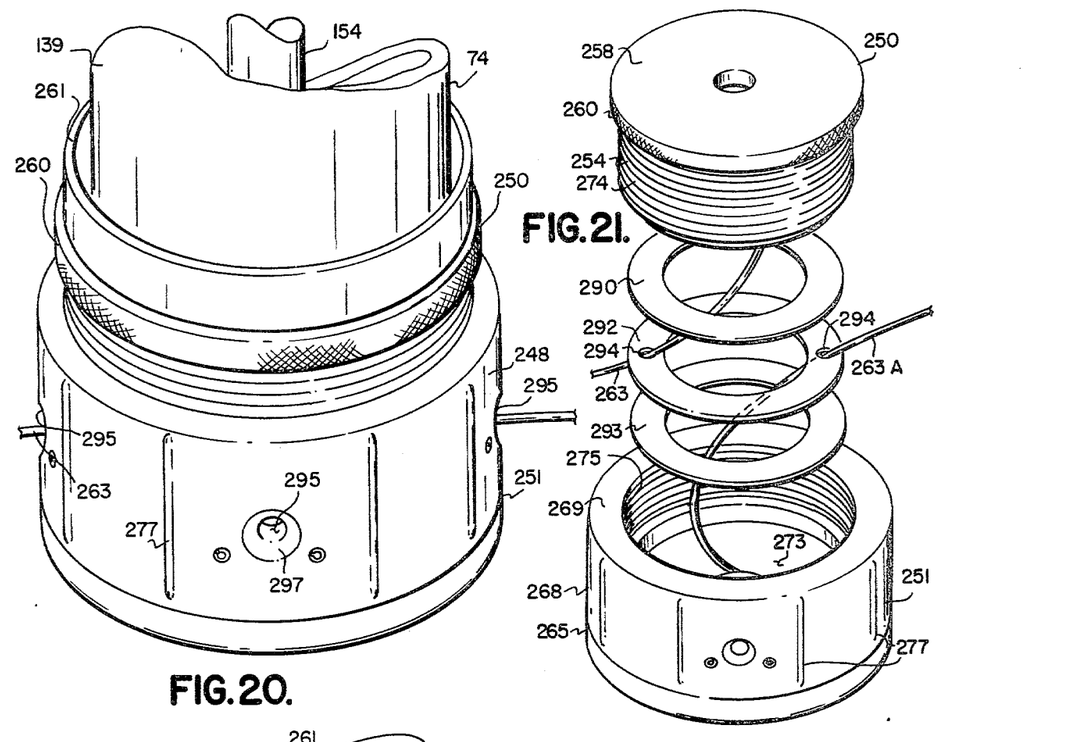
FIG. 20 is a partial perspective view of the cutter head assembly of the device of FIG. 1 and having connected thereto a rotor constructed in accordance with the teachings of the instant invention.
FIG. 21 is an exploded perspective view of the rotor of FIG. 20.
Figure 22:
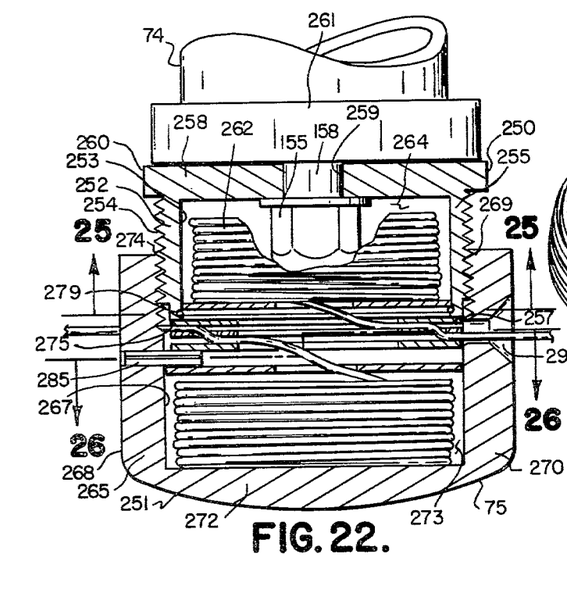
FIG. 22 is an elevation view partly in section of the rotor of FIG. 20.

Rotor 75 is illustrated in FIGS. 20, 21 and 22. Rotor 75 has a substantially closed hollow housing 248 comprised of first and second opposed detachably engaged cup-shaped members 250 and 251 respectively. First cup-shaped member 250 includes cylindrical section 252 having internal and external cylindrical surfaces 253 and 254, said first end 255 and second end 257.

Figure 23:
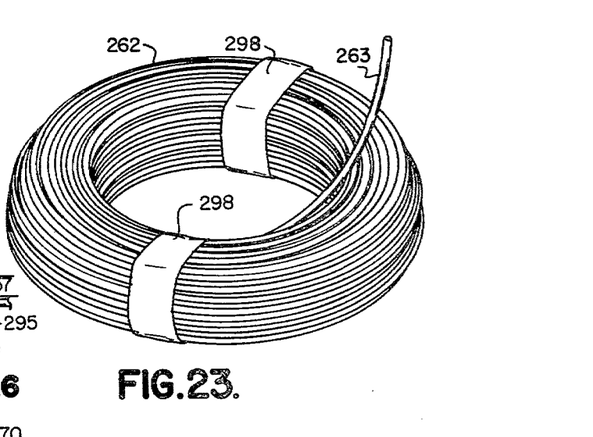
FIG. 23 is a cartridge of whip material useful in connection with the rotor of FIG. 20.
Figure 24:
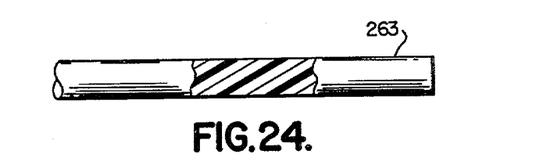
FIG. 24 is an enlarged elevation view partly in section of a length of the whip material of the cartridge of FIG. 23.
Figure 25:
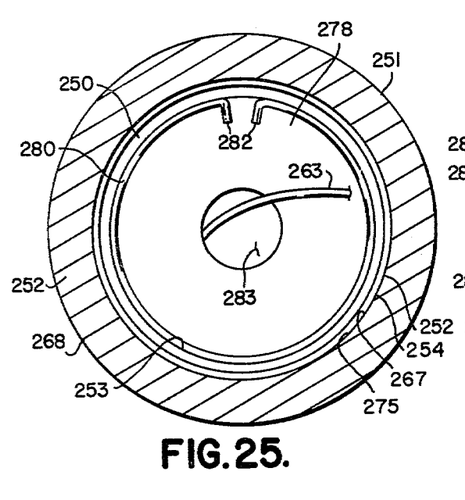
FiG. 25 is a horizontal sectional view taken along the line 25—25 of FIG. 22.
Figure 26:
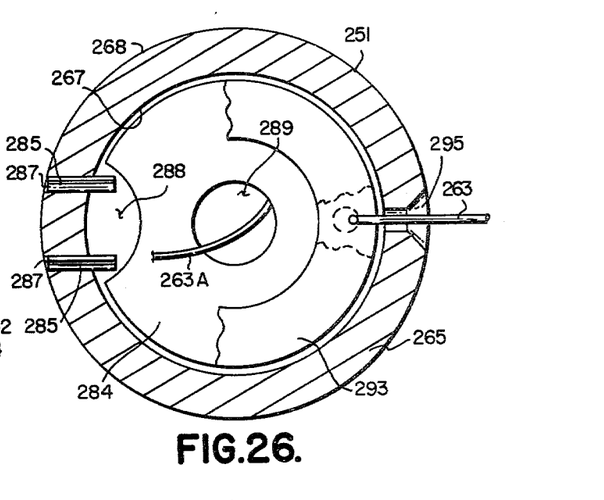
FIG. 26 is a horizontal sectional view taken along the line 26—26 of FIG. 22.

First end 255 of first cup-shaped member 250 is closed by cylindrical disk 258 having bore 259 therethrough for attachment to the supporting hub of the cutting head assembly 74, as hereinbefore described. Disk 258 has a peripheral knurled surface 260. Second end 257 is open for insertion of a coil, or cartridge, 262 of string-like whip material 263, as seen in FIGS. 23 and 24, into cavity 264 within first cup-shaped member 250. Coil 262 will be described in greater detail presently.

Second cup-shaped member 251, in general similarity to first cup-shaped member 250, has cylindrical section 265 with internal and external surfaces 267 and 268, respectively. Cylindrical section 265 has a first end 269 which is open and a second end 270 which is closed by end wall 272, forming cavity 273 therein. Cavity 273 also receives a cartridge 262.

A male thread 274 is carried on external surface 254 and is matingly engageable with a female thread 275 carried on internal surface 267. A plurality of longitudinally extending upstanding ridges 277 are angularly spaced about external surface 268 of second cup-shaped member 251. Ridges 277 and knurled peripheral surface 260 provide non-slip surfaces for respective hands of the user while rotating one cup-shaped member relative the other cup-shaped member.

A relatively thin rigid disk 278, as might be fabricated from metal, plastic or fiberous material, is sized to be closely received within internal surface 253 of first cup-shaped member 250. An annular groove 279 is formed in internal surface 253 and receives annular retention member 280 which is resiliently biased to normally expand to a diameter larger than annular groove 279. Annular retention member 280 is split at one place providing two ends 282 which are bent inwardly. In accordance with the foregoing structure, coil 262 is retained between disk 258 and disk 278. For removal or replacement of coil 262, ends 282 are urged together compressibly reducing the diameter of annular retention member 80, which is then removed from groove 279. Normally, when in place, retention member 280 provides an obstruction preventing disk 278 from separation with first cup-shaped member 250 and retaining loosely coil 262 within cavity 264 between disk 278 and disk 258. Disk 278 has a centrally located aperture 283 from which whip material 263 is withdrawn.

A second coil 262 is loosely retained within cavity 273 of second cup-shaped member 251 by thin rigid disk 284. A plurality of pins 285 project inwardly from inner surface 267 and are securely held in bores 287. Preferably the pins are arranged in pairs and four pairs are equiangularly spaced about cylindrical section 265. Accordingly, disk 284 has four equiangularly spaced peripheral cut-outs which provide for insertion of disk 284 into cavity 273 beyond pins 285. Subsequently, disk 285 is rotated approximately 45° wherein pins 285 are aligned between cut-outs 288 for retaining disk 284. Whip material from second coil 262, specifically designated 263a, is withdrawn from cavity 273 through aperture 289 centrally located within disk 284.

Three annular plates 290, 292 and 293 reside between pins 285 and second end 257 of first cup-shaped member 250. Plate 290 is a first clamping member and bears against end 257. Plate 293 is a second clamping member and bears against pins 285. Plate 292 has a pair of diametrically opposed apertures 294 and is considered a guide means. Four equiangularly spaced passages 295 extend radially through second cup-shaped member 251. Each aperture 295 has a conical bevel 297 at the external end thereof. In the immediate embodiment, as seen in FIG. 22, each aperture 295 is longitudinally spaced along second cup-shaped member 251 to coincide with guide means plate 292.

Figure 29:
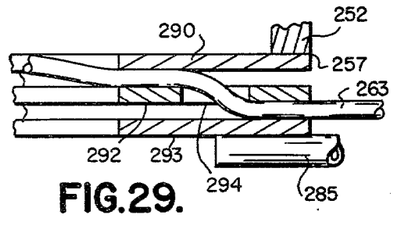
FIG. 29 is an enlarged fragmentary vertical sectional view of a portion of the device of FIG. 27.

In preparation for use, a length of whip material 263 is withdrawn from aperture 283 in disk 278, passed through first clamping member 290, through an aperture 294 in guide means 292 and through one passage 295. Passages 295 provides egress for whip material 263 from the interior to the exterior of housing 248. Similarly, whip material 263a from second coil 262 in second cup-shaped member 251 is withdrawn through aperture 289 in disk 284, through second clamping member 293 and the other aperture 294 in guide means 292. Whip material 263 is passed through any selected passage 295 in housing 248. The strand of whip material, designated 263a is passed through a passage 295 diametrically opposed to the first selected passage. After a selected length of whip material is withdrawn from housing 248, second cup-shaped member 251 is rotated relative first cup-shaped member 250, clamping the whip material. As specifically seen in FIG. 29, whip material strand 263 is double clamped, first between first clamp member 290 and guide means 292 and secondly between guide means 292 and second clamping member 293. The length of whip material 263a is similarly clamped, except passing first between second clamp member 293 and guide means 292 and secondly passing between guide means 292 and first clamp member 290.

It will be appreciated that the plates 290, 292 and 293 and the strand of whip material is compressed between end 257 of cylindrical section 252 and pins 285. As additional whip material is needed, first cup-shaped member 250 is rotated slightly relative second cup-shaped member 251, relaxing the pressure between end 257 and pins 285. After the desired length of material has been withdrawn from housing 248, cup-shaped members 250 and 251 are relatively rotated in a reverse direction. The camming action between external and internal threads 274 and 275, respectively, draw end 257 and pins 285 together to re-establish the clamping action of plates 290, 292 and 293.

Whip material 263 is preferably a single strand of nylon, plastic or other material, commonly referred to as monofiliment line. The entire cartridge, or coil, 262 is a single strand which is wound into a coil. The coil begins at the center and is serially wound successive loops, such that the loops are always accessible from the center. In other words, strand 263 can be withdrawn continuously from cartridge 262 without causing cartridge 262 to rotate. Prior to use, cartridge 262 is retained in the coiled configuration by bands 298 which extend around diametrically opposed sectors of the coil. Each band 298 is of a fragile material, such as paper or tape, which is readily torn in response to pressure exerted upon the strand as it is withdrawn from housing 248 after the cartridge has been placed within the appropriate cavity.

Figure 27:
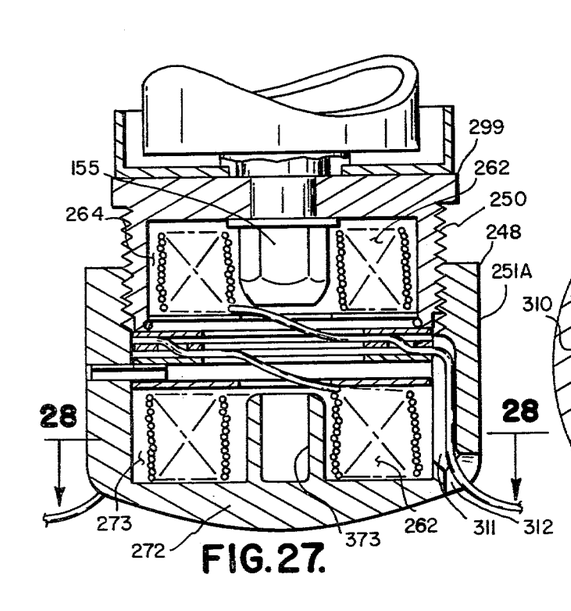
FIG. 27 is a view generally corresponding to the view of FIG. 22 and showing further components thereof in section.
Figure 28:
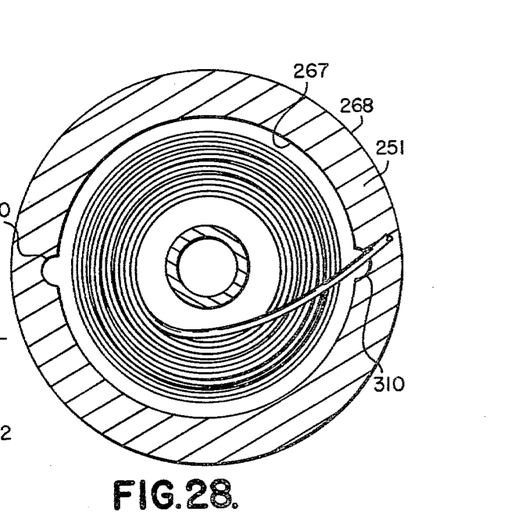
FIG. 28 is a horizontal sectional view taken along the line 28—28 of FIG. 27.

FIGS. 27 and 28 illustrate an alternate embodiment of a rotor, constructed in accordance with the teachings of the present invention and generally designated 299. In general, rotor 299 and rotor 75 are identical, utilizing the same components. The difference is that alternate second cup-shaped member herein specifically designated 251a is not provided with passages 295. Instead, the egress comprises a pair of diametrically opposed grooves 310 extending longitudinally within inner surface 267. Each groove 310 terminates proximate end wall 272 with a passage 311 having conically beveled end 312. Functionally, rotor 75 and modified rotor 299 are equivilent.

As previously seen in FIG. 22, nut 155 provides a spindle residing in the open center of coiled cartridge 262 and preventing entanglement of the individual loops. As specifically seen in FIG. 27, a spindle 373 extends centrally of end 272 into cavity 273 for a similar purpose. It is also noted in FIG. 27 that the coiled cartridged 262 are wound to have a generally rectangular cross section for the purpose of filling cavities 264 and 273 to the extent practical. It will be appreciated by those skilled in the art that the elimination of the usual spool mechanism used to carry whip material provides additional space within the cavities for carrying an additional supply of whip material. Thus, the frequency with which the operator must reload the rotor is substantially decreased. Further, the expenses of time and finances associated with purchasing and winding of whip material of spools is eliminated. Further, since the coils do not rotate during dispensing of the whip material, a potential trouble source has been eliminated.

Figure 30:
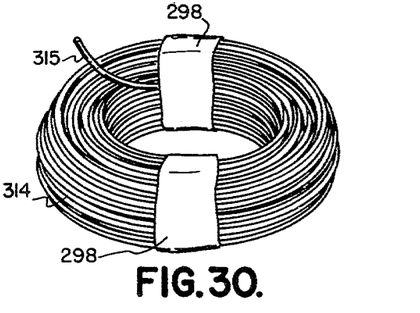
FIG. 30 is a perspective view of an alternate cartridge for use in connection with the rotor of FIG. 20.
Figure 31:
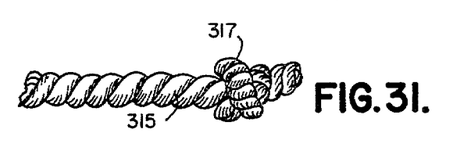
FIG. 31 is an enlarged elevation view of a length of the whip material of the cartridge of FIG. 30.

FIGS. 30 and 31 illustrate an alternate cartridge 314 usable with the foregoing described rotor. Cartridge 314 is wound, shaped and banded as previously described in connection with cartridge 262. Whip material 315, however, is stranded, as best seen in FIG. 31. The stranded material 315 comprises a plurality of innerwoven flexible monofilament strands of fiber, plastic or other well known material, and may include the cordage commonly known as seine twine. To prevent ravelling of the stranded material, a knot, such as shown at 317, is periodically tied in the material as it is pulled from the rotor. It is recommended that knots be placed about every three inches. Preferably, as the inmost portion of each strand becomes abraded during use, a subsequent three inches is pulled from the housing and a new knot tied adjacent the housing. In addition to preventing ravelling of the stranded material, knots 317 also increase the cutting efficiency of the whip.

Figure 32:
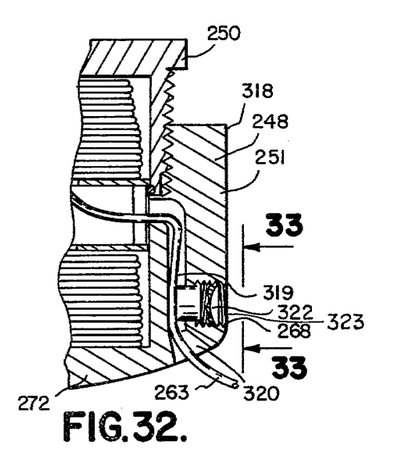
FIG. 32 is a fragmentary vertical sectional view generally corresponding to a portion of the view of FIG. 27 and illustrating an alternately preferred embodiment thereof.
Figure 33:
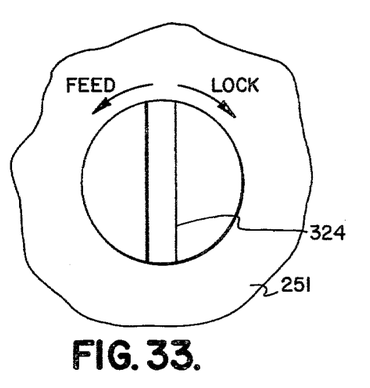
FIG. 33 is a fragmentary elevation view looking from the direction of arrows 33 in FIG. 32.

FIGS. 23 and 33 illustrate yet an alternate rotor 318. Constructed generally similar to previously described rotor 75, rotor 318 includes housing 248 having engageable first and second cup-shaped members 250 and 251. In the immediate embodiment, plate members 290, 292 and 293 are eliminated. A longitudinal egress 319, having conical bevelled end 320, is formed through second cup-shaped member 251 from end wall 272. A drilled and tapped hole 322 extends radially inward from external surface 268 to egress 319. Externally threaded plug 323 is received within hole 322 for clamping whip material 263. Plug 323 is rotated by slot 324 which is sized and shaped to receive the tip of a screwdriver or the edge of a coin.

Figures 34, 35, 36, 37:
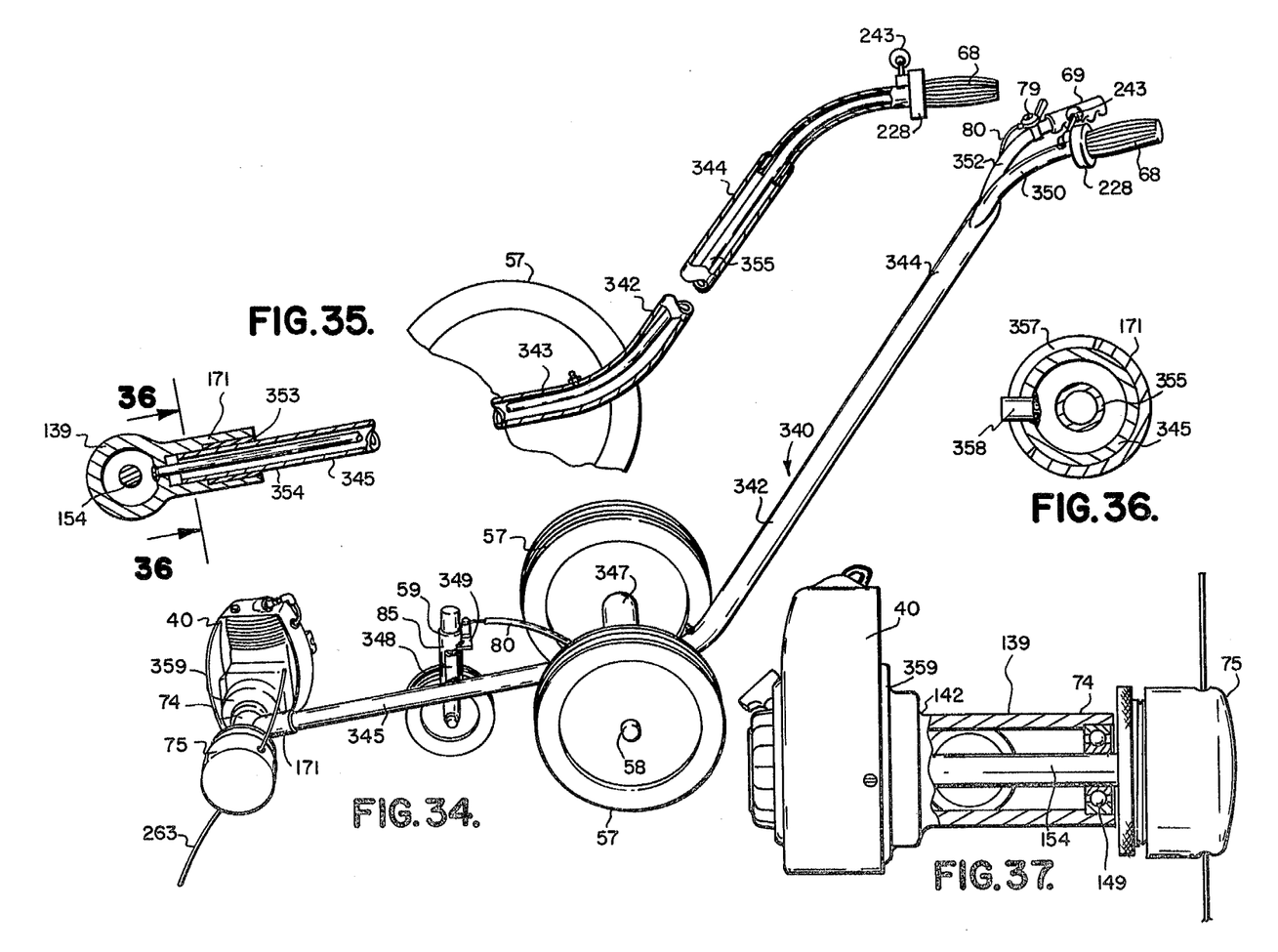
FIG. 34 is an alternately preferred embodiment of a grass cutting machine embodying the principles of the instant invention.
FIG. 35 is an enlarged fragmentary view corresponding to the illustration of FIG. 34 and partly in section.
FIG. 36 is a vertical sectional view taken along the line 36—36 of FIG. 35.
FIG. 37 is a front elevation view, partly in section, of the forward portion of the machine of FIG. 34.

FIG. 34 illustrates an alternate embodiment of a grass cutting and trimming machine constructed in accordance with the teachings of the present invention and generally designated by the reference character 340. Machine 340 has an elongate continuous tubular member 342 including a frame section 343 with a handle section 344 extending upwardly rearward therefrom and a boom section 345 extending forwardly therefrom. Many of the previously described components are used in the immediate embodiment. To the extent that such components have been previously described and the immediate use is obvious, such components will be references without further detailed explanation.

Proximate the junction of frame section 343 and handle section 344, a tubular housing 347 is transversely affixed, as by welding, to tubular member 342. Axle 58 is carried by tubular housing 347 and rotatably supports wheels 57. Forward of wheels 57 is secured a bracket 348 which supports wheel assembly 59. In the absence of previously described frame member 44, bracket 349 is welded to housing 85 to support retention member 115.

The free end of handle section 344 is bifurcated having left and right sections 350 and 352. Rotatable hand grip 68 and locking mechanism including drum 228 and handle 243 are carried as previously described by left section 350. Similarly, hand grip 69 and handle 79 are carried by right section 352. Cable 80 extends between handle 79 and wheel assembly 59.

As further illustrated in FIGS. 35 and 36, tubular member 171 extending from cutting head assembly 74 is bored to accept bearing 353, which is rotatably journaled at the free end 354 of boom section 345. Bearing 353 is specifically illustrated as a bronze bushing. Various other types of bearings will readily occur to those skilled in the art, as well as further methods of rotatably attaching cutting head assembly 74 to boom 345. Cable 355 extends through tubular member 344 and is attached at one end thereof to end plate 217 and at the other end thereof cylindrical housing 139. Accordingly, cutting head assembly 74 rotates relative boom 345 in response to rotation of hand grip 68 by the operator.

The rotation of cutting head assembly 74 is limited between a vertical and a horizontal position. As illustrated in FIG. 36, a circumferential slot 357 is formed in tubular projection 171. A pin 358 is secured to boom section 345 extending radially therefrom through slot 357. Slot 357 extends approximately one-third of the way around tubular projection 171 for movement of cutting head assembly 74 slightly beyond vertical and horizontal limits.

As illustrated in FIG. 37, an annular flange 359 is affixed to second end 142 of housing 139 of cutting head assembly 74. Engine 40 is affixed by bolts or other expedient means to flange 359. Various couplings are commercially available for uniting the crank shaft of engine 40 with shaft 154, as will be readily understood by those skilled in the art.

Various modifications and changes to the embodiments herein chosen for purposes of illustration will readily occur to those skilled in the art. For example, in either of the primary embodiments, the engine can be carried by the frame section or attached directly to the cutting head assembly. While the source of power has been specifically illustrated herein as an internal combustion engine, it is recognized that other equivilent power sources exist, such as electric motors, which are readily interchangeable therewith. Further, the various components may be fabricated from different materials consistent with the technology and capabilities of selected manufacturers. Preferably, the main frame is fabricated from metal, such as steel or aluminum. Consistent with current fabrication techniques, the rotor is readily molded or cast of plastic, such as polyvinylchloride, or metal, such as aluminum.

To the extent that such modifications and variations do not depart from the spirit of the invention, such modifications are intended to be included therein and limited only by the scope of the following claims.

Having fully described and disclosed the invention and the preferred embodiments thereof in such clear and concise terms as to enable those skilled in the art to understand and practice the same, the invention claimed is:

1. In a rotor for carrying a coil of string-like whip material and for use with a grass cutting machine having means for rotating said rotor, the improvements in said rotor comprising:
(a) a substantially closed hollow housing for enclosing loosely a pair of coils of said whip-like material and including first and second opposed detachably engageably cup-shaped members, each said cup-shaped member having an open end and a closed end and having generally cylindrical internal and external surfaces, said first cup-shaped member having complementary connection means for engagement with said machine and for rotation about the longitudinal axis of said housing;

(b) egress means extending through said housing for the passage of a length of said whip material from said coils, said whip material extending selected lengths from said housing;

(c) clamp means carried by said housing for releasably retarding the movement of said whip material through said egress;

(d) first retention means for positioning loosely one of the coils of whip material in the first cup-shaped member; and (e) second retention means for positioning loosely the second coil of whip material in the second cup-shaped member.

2. In a rotor as defined in claim 1, in which the egress means include:

(a) a first egress opening through said housing for the passage of whip material from said first coil; and (b) a second egress opening extending through said housing for the passage of whip material from said second coil, said second egress opening being diametrically opposed to said first egress opening.

3. The rotor of claim 2, wherein said first retention means includes:

(a) a generally cylindrical disk having an aperture therethrough and sized to be received within said first cup-shaped member;

(b) an annular groove extending into the internal surface of said first cup-shaped member and spaced from the closed end thereof; and (c) an annular member resiliently engageable within said groove and engageable with said disk for retaining said disk with said first cup-shaped member.

4. The rotor of claim 3, wherein said second retention means includes:

(a) a projection extending inwardly from the internal surface of said second cup-shaped member and spaced from the closed end thereof; and (b) a disk sized to be received within said second cup-shaped member and having an aperture therethrough and having a peripheral indentation for the passage of said projection as said disk moves from the open end toward the closed end of said second cup-shaped member.

5. The rotor of claim 4, wherein said clamp means includes:

(a) abutment means extending inwardly from the internal surface of said second cup-shaped member;

(b) a first rigid disk member having an aperture therethrough and moveably received within said first cup-shaped member and bearing against said abutment means;

(c) a second rigid disk member having an aperture therethrough and moveably secured in said second cup-shaped member adjacent said first disk member, the whip material from said first coil passing through the aperture in said first disk member and passing between said first and said second disk members, the whip material from said second coil passing through the aperture in said first disk member and passing between said first and said second disk members, said whip material being clamped between said first and said second disk members as the open end of said first cup-shaped member is moved toward said abutment means in response to camming advancement of said first cup-shaped member within said second cup-shaped member.

6. The rotor of claim 5, further including guide means for said whip material intermediate said first and said second disk members, said guide means having a first aperture for passage of whip material from said first coil and a second aperture spaced from said first aperture for passage of whip material from said second coil.

* * * * *